United States Patent
Kudo

(10) Patent No.: US 7,907,204 B2
(45) Date of Patent: Mar. 15, 2011

(54) IMAGE REPRODUCING APPARATUS AND METHOD

(75) Inventor: Toshimichi Kudo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1396 days.

(21) Appl. No.: 10/443,767

(22) Filed: May 23, 2003

(65) Prior Publication Data

US 2003/0227551 A1 Dec. 11, 2003

(30) Foreign Application Priority Data

Jun. 11, 2002 (JP) ................. 2002-170375

(51) Int. Cl.
*H04N 5/222* (2006.01)

(52) U.S. Cl. ............. 348/333.03; 348/231.2; 348/231.5; 348/333.12; 348/222.1

(58) Field of Classification Search ............... 348/231.2, 348/231.5, 231.6, 222.1, 333.01, 333.02, 348/333.09, 333.12, 231.3; 358/906, 909.1
See application file for complete search history.

(56) References Cited

U.S. PATENT DOCUMENTS

| | | | | |
|---|---|---|---|---|
| 5,697,885 A | * | 12/1997 | Konomura et al. | 600/109 |
| 6,016,139 A | * | 1/2000 | Terasawa et al. | 345/169 |
| 6,501,503 B2 | | 12/2002 | Kudo | 348/208.99 |
| 6,573,930 B2 | | 6/2003 | Kyuma et al. | 348/208.5 |
| 6,738,075 B1 | * | 5/2004 | Torres et al. | 715/723 |
| 6,766,098 B1 | * | 7/2004 | McGee et al. | 386/46 |

\* cited by examiner

*Primary Examiner* — Yogesh K Aggarwal

(74) *Attorney, Agent, or Firm* — Fitzpatrick, Cella, Harper & Scinto

(57) ABSTRACT

An image reproducing arrangement reproduces plural segments of moving image data showing a series of moving images from a recording medium and arbitrarily designates a reproduction start position in selected moving image data of the plural moving image data segments. Plural representative images corresponding to the plural moving image data segments are displayed on the same screen. An indicator is displayed on the screen that is moved to indicate the designated reproduction start position in the selected moving image data at a predetermined position associated with the position where a representative image of the selected moving image data is displayed. The reproduction is controlled to reproduce the selected moving image data from the designated reproduction start position.

12 Claims, 12 Drawing Sheets

FIG. 4A 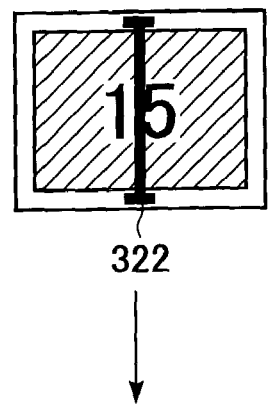 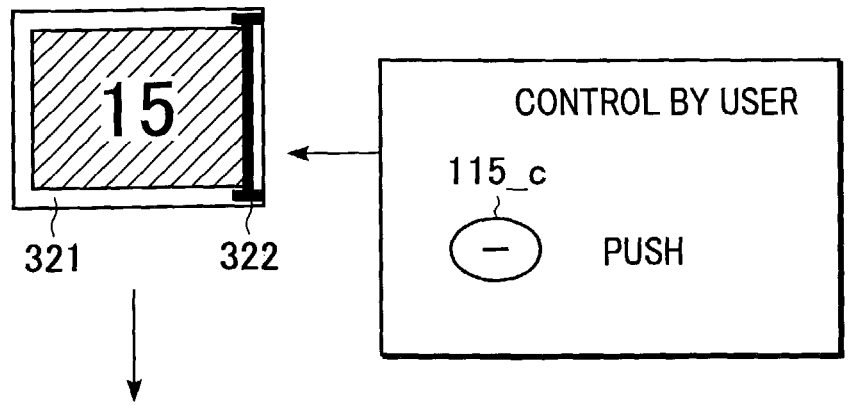
321  322
FIG. 4B
322

322

IMAGE REPRODUCING APPARATUS AND METHOD

BACKGROUND OF THE INVENTION

1. Field of the Invention

The present invention relates to an apparatus and a method for reproducing images and, more particularly, to an apparatus and a method for reproducing image data by using representative images of moving image data or still image data.

2. Description of the Related Art

A conventional digital video camera for recording and/or reproducing image data in and/or from a magneto-optical disk, a hard disk, or a recording medium, such as a memory card, permitting random access has a display unit, such as an electronic view finder (hereinafter referred to as "EVF") or a liquid crystal panel, and an output terminal for supplying data to an apparatus, including a television apparatus (television monitor) and a personal computer (PC).

This type of video camera displays an object, such as a moving image, on its display unit in a videotaping mode, while it displays a reproduced image in a reproduction mode. The video camera also displays information required for making various settings or selection.

An IEEE1394 terminal or a USB terminal used for the output terminal permits connection between the digital video camera and a television monitor, a PC or various other types of equipment, including a digital television apparatus and a video cassette recorder.

FIG. 12 illustrates an example of a control screen 1500 shown on a display unit to allow the selection of a moving image clip to be reproduced from among a plurality of moving image clips when reproducing obtained image data in this type of digital video camera.

The control screen 1500 is displayed not only on the display unit of the digital video camera, but also on another apparatus having a display function, for example, when the apparatus is connected to the output terminal.

Referring to FIG. 12, the control screen 1500 has display regions 1503 through 1508 for displaying a representative image of each moving image clip, a cursor 1509, a slider 1510, a pointer 1511 and a video clip information display region 1502.

A representative image displayed in any of the representative image display regions 1503 through 1508 is a single-frame image among a number of frames constituting a moving image clip, the image having been reduced to a predetermined size (hereinafter referred to also as a "thumbnail image"). The data on such representative images is usually stored in a header section in a file of moving image clips, or generated using image data for one screen among moving image data, as necessary.

A user moves the cursor 1509 by operating keys so as to select a desired moving image clip from among the representative images displayed in the representative image display regions 1503 through 1508.

FIG. 12 shows an example in which the moving image clip corresponding to the representative image shown in the representative image display region 1505 has been selected. The slider 1510 and the pointer 1511 provide information roughly indicating which images among all moving image clips recorded in a recording medium correspond to the representative images (a group of thumbnails) currently shown on the representative image display regions 1503 through 1508.

The video clip information display region 1502 displays the information, namely, video clip information, regarding the moving image clip pointed at by the cursor 309. FIG. 12 exemplarily shows the video clip information "15/30" and "ABCD0015" in the video clip information display region 1502. The information "15/30" indicates that a total of 30 moving image clips have been recorded in the recording medium, and when they are sorted out in a predetermined order, the moving image clip selected by the cursor 1509, that is, the moving image clip associated with the representative image displayed in the representative image display region 1505, is the 15th clip.

For instance, if a user performs a reproduction operation in this state, then the procedure for reproducing the moving image clip selected by the cursor 1509 is started. Upon completion of the reproduction procedure, the control screen 1500 is displayed again.

Alternatively, the moving image clips are reproduced in succession unless the user interrupts the reproducing operation, and upon the completion of the reproduction of the last moving image clip, the program returns to the control screen 1500.

The control screen 1500 may display various types of information, including the remaining amount of the battery of the digital video camera and the presence of a recording medium. The cursor 1509 may be indicated in a frame-like configuration surrounding a representative image rather than the black triangle, as shown in FIG. 12.

A user interface like the control screen 1500 shown in FIG. 12 has a configuration similar to the user interface in the so-called digital camera adapted mainly to shoot and reproduce still images.

The user interface of a digital video camera handling moving images and the user interface of a digital camera handling still images are different only in whether an image to be selected is a still image or a one-frame image in the frames making up a moving image.

Thus, a video tape, for example, is an extensively used medium for recording moving images, and a video cassette recorder or a video camera represents a typical recording and/or reproducing apparatus using the video tape.

The video tape, which by nature permits no random access, has to be rewound or fast-forward fed to reproduce a moving image recorded before or after the current position, requiring time for such an operation.

The main unit of the recording and/or reproducing apparatus using a video tape is provided with a display for showing, for example, a bar indicating the current reproduction position, a remaining amount and a counter, thus allowing the user to recognize the current reproduction position on the video tape.

However, the conventional digital video camera using the recording medium that permits random access as mentioned above has been posing a problem with its construction for the display and control in selecting moving image clips to be reproduced, as described below.

For example, in the control screen 1500 shown in FIG. 12, when selecting a moving image clip to be reproduced by using a representative image, in case of a still image clip, there should be no problem because the representative image matches a still image to be reproduced with one-to-one correspondence.

In the case of a moving image clip, however, the method illustrated in FIG. 12 permits only one mode to be selected, in which the reproducing operation always starts with the beginning of a moving image clip, so that the reproduction cannot be started in the middle of a moving image clip.

Furthermore, a user who is familiar with equipment using a video tape rather than equipment that uses a recording medium permitting random access may feel uncomfortable with the operation of the equipment using the randomly accessible recording medium or may lose firm sense of time.

SUMMARY OF THE INVENTION

It is an object of the present invention to solve the problems described above.

It is another object of the present invention to make it possible to easily start reproduction at any position of a selected moving image clip.

To these ends, according to one aspect of the present invention, there is provided an image reproducing apparatus including a reproducing device for reproducing a plurality of pieces of moving image data showing a series of moving images from a recording medium, a reproduction position specifying device for arbitrarily specifying a reproduction start position in moving image data selected from among the plurality of pieces of moving image data, a displaying device for displaying a plurality of representative images respectively corresponding to the plurality of pieces of moving image data on the same screen and for displaying an indicator that indicates the reproduction start position specified by the reproduction position specifying device in the selected moving image data at a predetermined position associated with the position where a representative image of the selected moving image data is displayed, and a controller for controlling the reproducing device so as to reproduce the selected moving image data from the reproduction start position specified by the reproduction position specifying device.

According to another aspect of the present invention, there is provided an image producing method including a reproduction step for reproducing a plurality of pieces of moving image data showing a series of moving images from a recording medium, a reproduction position specifying step for arbitrarily specifying a reproduction start position in moving image data selected from among the plurality of pieces of moving image data, a displaying step for displaying a plurality of representative images respectively corresponding to the plurality of pieces of moving image data on the same screen and for displaying an indicator that indicates the reproduction start position specified in the reproduction position specifying step in the selected moving image data at a predetermined position associated with the position where a representative image of the selected moving image data is displayed, and a control step for controlling the reproduction step so as to reproduce the selected moving image data from the reproduction start position specified in the reproduction position specifying step.

Further objects, features and advantages of the present invention will become apparent from the following description of the preferred embodiments with reference to the attached drawings.

DESCRIPTION OF THE PREFERRED EMBODIMENTS

Embodiments of the present invention will now be described in conjunction with the accompanying drawings.

First Embodiment

Figure 1:
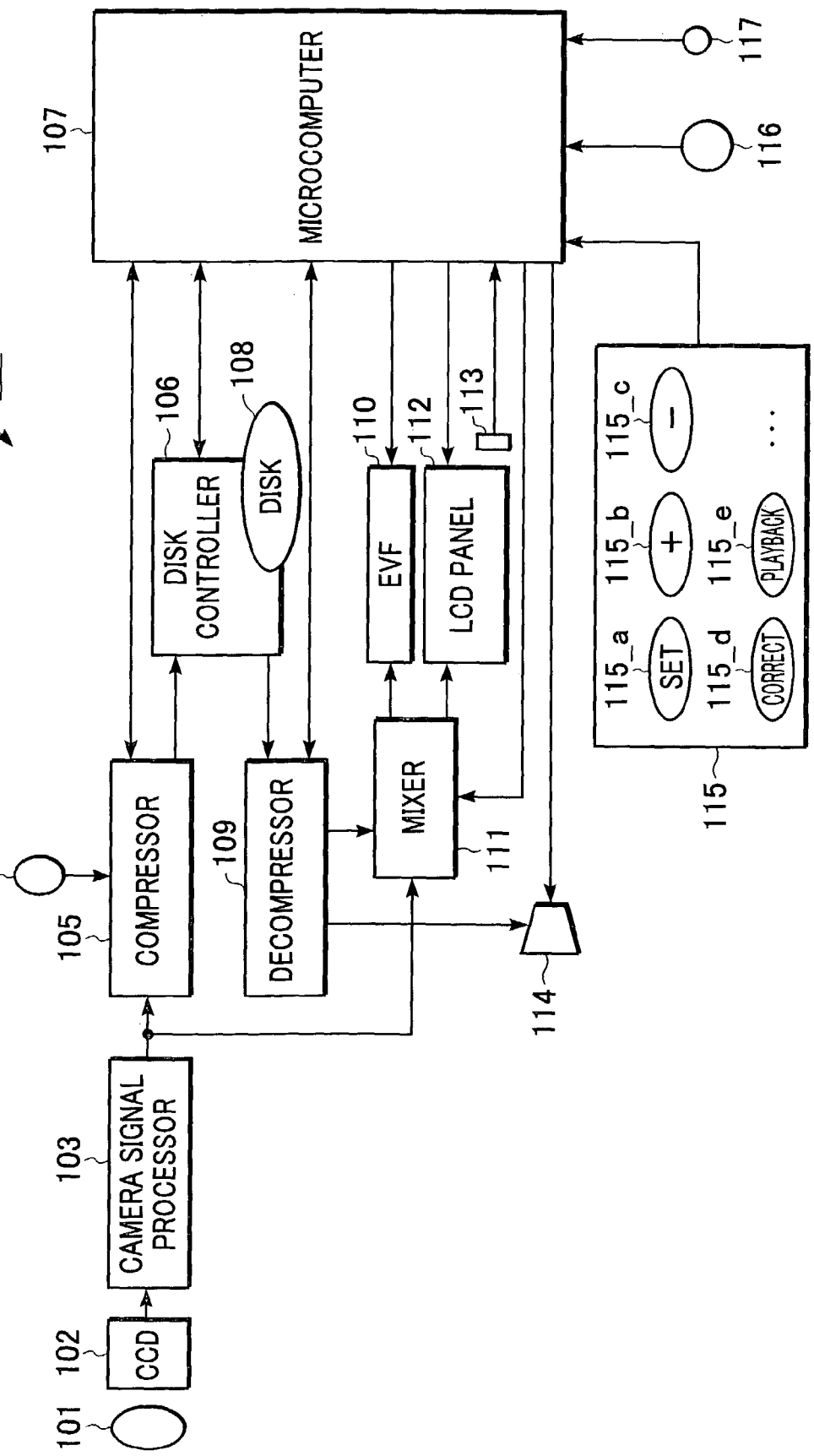
FIG. 1 is a block diagram showing the construction of a video camera according to a first embodiment, to which the present invention has been applied.

FIG. 1 is a block diagram showing the construction of a video camera 100 to which the present invention has been applied.

The video camera 100 according to this embodiment records and reproduces a plurality of moving image data respectively indicating a series of moving images in and from a disk 108. To reproduce these pieces of moving image data, an EVF 110, in particular, is configured to display the representative images of the plural pieces of moving image data on the same screen of a liquid crystal panel 112. The screen displays the information regarding the reproduction start position for the moving image data to be reproduced that has been specified by a user operating a group of switches 115, the information being displayed in the vicinity of the representative images of the specified moving image data, and reproduces the moving image data from the specified reproduction start position. This arrangement allows moving image data to be easily reproduced from any position or frame.

The following will specifically explain the configuration and operation of the video camera 100.

<Configuration of the Video Camera 100>

Figure 2:
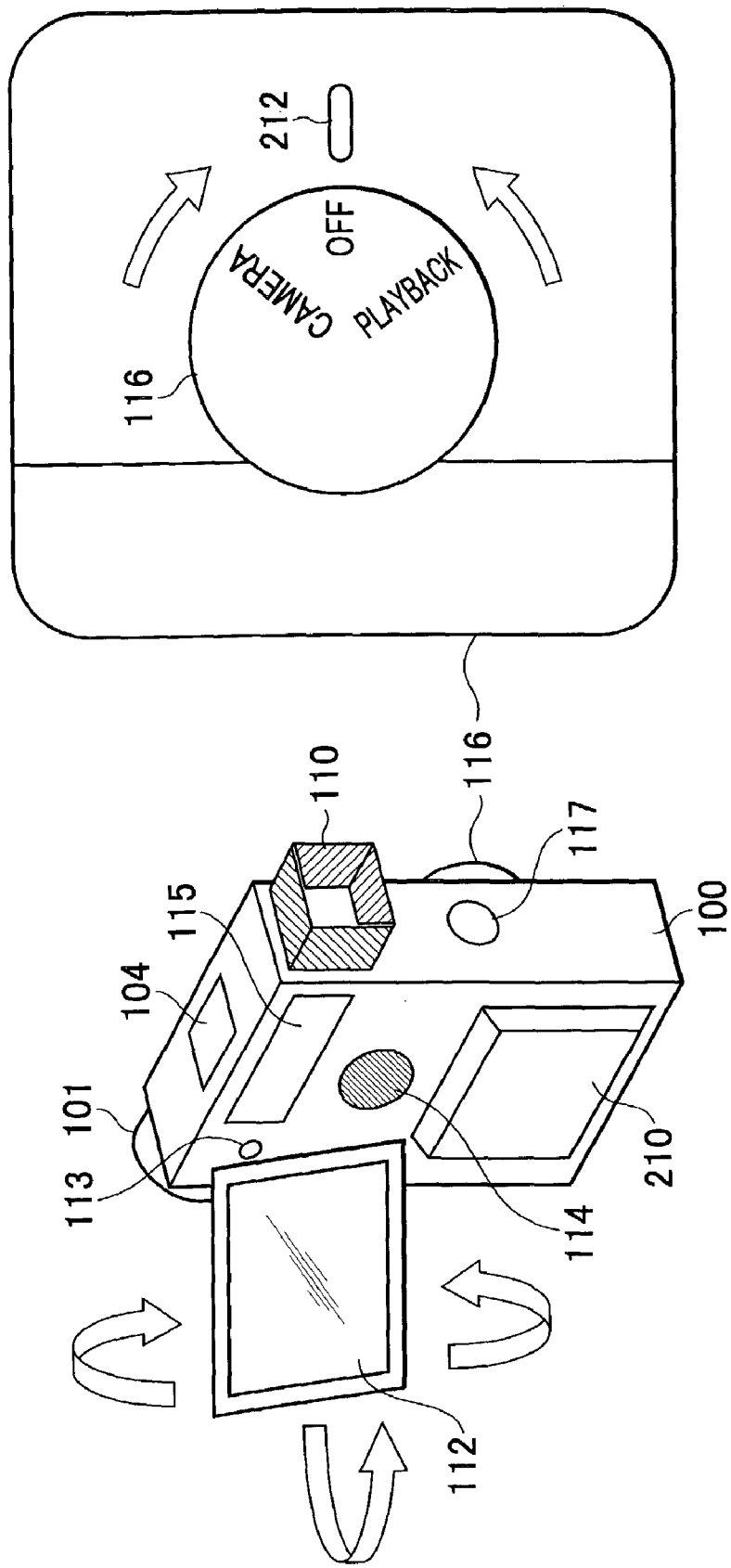
FIG. 2 is an external view of the video camera.

FIG. 2 shows the external view of the video camera 100 having the internal configuration shown in FIG. 1.

Reference numeral 100 in FIG. 2 denotes the main unit of the video camera (hereinafter referred to simply as "the main unit").

The main unit 100 includes a system for recording and/or reproducing moving image data and audio data that have been encoded using, for example, a moving picture experts group (MPEG) encoding method or other encoding method, in and from a recording medium, such as a hard disk or a magneto-optical disk, as it will be discussed hereinafter.

Reference numeral 101 denotes a lens assembly and reference numeral 104 denotes a microphone. The microphone 104 is provided to input sound into the main unit 100 while shooting.

An electronic view finder (EVF) 110 enables a user to visually check an object while shooting. Turning the EVF 110 on and off is controlled by a control feature provided in the main unit 201.

A trigger switch 117 is a pushbutton. The user operates the trigger switch 117 to cause the video camera 100 to start or stop shooting. Basically, the main unit 100 is adapted to record the moving image data recorded from the moment the shooting start is directed to the moment the shooting end is directed through the trigger switch 117 as one file with a name given thereto, and also to record additional information required for reproducing the recorded image data. Such additional information makes it possible to accomplish special reproducing operations, including fast forward feed, and various types of display.

A mode dial 116 is a rotary switch marked with, for example, "PLAYBACK" indicating the feature for engaging a reproduction mode, "CAMERA" indicating the feature for engaging a camera mode, and "OFF" indicating the feature for turning the main unit OFF, as shown in the enlarged view of the front surface of the mode dial 116 at right in FIG. 2. A bar 212 is also provided on the main unit 201, in the vicinity of the mode dial 116.

The arrangement described above enables the user to set the main unit 201 in a desired mode by turning the mode dial 116 to set the desired mode mark among the "PLAYBACK", "CAMERA" or "OFF" at the bar 212. For instance, in the reproduction mode, the camera feature is set to an OFF state, and recorded data is reproduced, also allowing a feature for editing or deleting data or other features to be implemented, as necessary. In the camera mode, the main unit 201 is started in the mode primarily for shooting.

A group of control switches 115 is provided for a user to operate the main unit 201, and includes keys mainly for controlling a reproducing system or selecting menus.

A liquid crystal panel 112 is installed such that it can be opened or closed with respect to the side surface of the main unit 201, and also rotated in the horizontal direction in an opened state. As in the case of the EVF 204, the liquid crystal panel 112 is configured primarily for checking objects during a shooting operation and for displaying reproduced images during a reproducing operation. Also as in the case of the EVF 204, turning the liquid crystal panel 112 on and off is controlled by a control feature in the main unit 201.

A panel opening/closing detection switch 113 electrically detects the state in which the liquid crystal panel 112 is closed. For instance, the frame of the liquid crystal panel 112 has a protuberance, which pushes the panel opening/closing detection switch 113 when the liquid crystal panel 112 is closed. This arrangement allows the control feature in the main unit 201 to recognize the two states, namely, the state in which the panel opening/closing detection switch 113 is pressed, and the state in which the switch 113 is released.

A speaker 114 is provided for audio output during reproduction. A battery 210 is detachably installed in the main unit 201.

Referring now to FIG. 1, the internal configuration of the main unit or the video camera 100 shown in FIG. 2 will be described.

The video camera 100 includes the lens unit 101, a charge coupled device (CCD) 102, a camera signal processor 103, the microphone unit 104, a compressor 105, a disk controller 106, a microcomputer 107, a disk 108, a decompressor 109, the EVF 110, a mixer 111, the liquid crystal panel 112, the panel opening/closing detection switch 113, the speaker unit 114, the group of control switches 115, the mode dial 116 and the trigger switch 117.

The microcomputer 107 controls the operation of the entire video camera 100. The control conducted by the microcomputer 107 implements the features of the video camera 100 explained in this embodiment.

The lens unit 101 includes a group of fixed lenses for condensing, a group of variable power lenses, an aperture, an arrangement for correcting an image forming position dislocated by the movement of the group of variable power lenses, and a group of correcting lenses serving also as a focal adjustor.

The lens unit 101 having the aforesaid configuration causes an object image to be finally formed on the image forming surface of a CCD, namely, an image pickup sensor.

The CCD 102 converts an object beam from the lens unit 101 into electric charges so as to produce an image signal of the object and outputs the image signal. The camera signal processor 103 carries out predetermined processing on the image pickup signal from the CCD 102 to generate digital image data, and outputs the generated data.

The microphone unit 104 provided to collect sounds during a shooting operation primarily includes predetermined amplitude and band limiters, and an A/D converter. With this arrangement, the microphone unit 104 generates and outputs digital audio data.

The compressor 105 encodes the digital image data created by the camera signal processor 103 and the digital audio data supplied by the microphone unit 104 according to the MPEG method so as to compress the information amount, and outputs the generated MPEG data.

The disk controller 106 controls writing and reading of data to and from the disk 108. The disk controller 106 controls the writing and reading of data according to a format used for a PC, such as a DOS file system.

In this embodiment, a magneto-optical disk is used as the disk medium 108; however, other types of medium may be used.

The decompressor 109 decodes the MPEG data read from the disk 108 by the disk controller 106, converts the MPEG data into image data and audio data, and outputs the image data and the audio data. The decompressor 109 has a feature of reducing or enlarging the image data obtained by decoding the MPEG data into any size.

The mixer 111 selects and outputs either the digital image data obtained by the camera signal processor 103 or the image data, i.e., the reproduced image data, obtained by the decompressor 109 by the control of the microcomputer 107. As necessary, character signals indicating diverse types of information are superimposed on image data, and the resulting data is output.

The mixer 111 has two channels (ch) of output stages that can be independently controlled. The EVF 110 and the liquid crystal panel 112 respectively receive output data from the mixer 111 and provide display outputs. The EVF 110 and the liquid crystal panel 112 individually have independent power sources, so that they can be turned on and off independently of the main unit 100 under control of the microcomputer 107.

The panel opening/closing detection switch 113 detects the opening/closing state of the liquid crystal panel 112 and notifies the microcomputer 107 of the detection result. The speaker unit 114 outputs the audio data obtained by the decompressor 109 as sounds when the MPEG data recorded in the disk 108 is reproduced. The volume of the sounds output from the speaker unit 114 can be controlled through the microcomputer 107.

The group of control switches 115 provided for a user to operate the video camera 100 includes a set key 115a, a plus key 115b, a minus key 115c, a correct key 115d and a playback key 115e.

The set key 115a decides on an item selected through a menu or the like and causes the operation for the selected item to be performed. The plus key 115b and the minus key 115c is used to select one of a plurality of menu items or to change the reproduction start position of a moving image clip, as it will be discussed hereinafter.

The group of control switches 115 includes keys for carrying out processing other than those described above, in addition to the keys 115a through 115e shown in FIG. 1.

The mode dial 116 is used to select the reproduction mode, the camera mode or the off mode. The trigger switch 117 is used to direct the start or end of videotaping when the camera mode has been selected and set by the mode dial 116.

<Operation of the Video Camera 100>

First, the processing carried out for normal moving image videotaping will be briefly explained.

When the camera mode is set by the mode dial 116, the microcomputer 107 controls the mixer 111 to display an object image output from the camera signal processor 103 on the EVF 110 or the liquid crystal panel 113. Under this condition, when the trigger switch 117 is operated, the microcomputer 107 controls the compressor 105 and the disk controller 106 to start writing the MPEG data obtained by the compressor 105 to the disk 108. In response to an instruction for starting recording, the compressor 105 encodes the image data of one frame at the head portion of moving image data separately from the MPEG data so as to generate a thumbnail image, and stores the thumbnail image in a predetermined portion, such as a header, of a moving image data file to record it in the disk 108.

If the trigger switch 117 is operated while the moving image is being recorded, then the microcomputer 107 controls the disk controller 106 to stop writing the MPEG data to the disk 108. Thus, a series of moving image data from the moment the shooting start is directed to the moment the shooting end is directed is recorded as one file in the disk 108. The same processing is repeated to record a number of moving image files, that is, moving image clips, into the disk 108.

The description will now be given of the operation for reproducing the moving image files recorded in the disk 108.

When the PLAYBACK mode is selected through the mode dial 116, the microcomputer 107 controls the disk controller 106 to reproduce the thumbnail images of the moving image files recorded in the disk 108 and to supply the thumbnail images to the decompressor 109. The decompressor 109 decodes the reproduced thumbnail images of the moving image files, adjusts the sizes and/or display positions of the thumbnail images, and supplies the results to the mixer 111.

Figure 3:
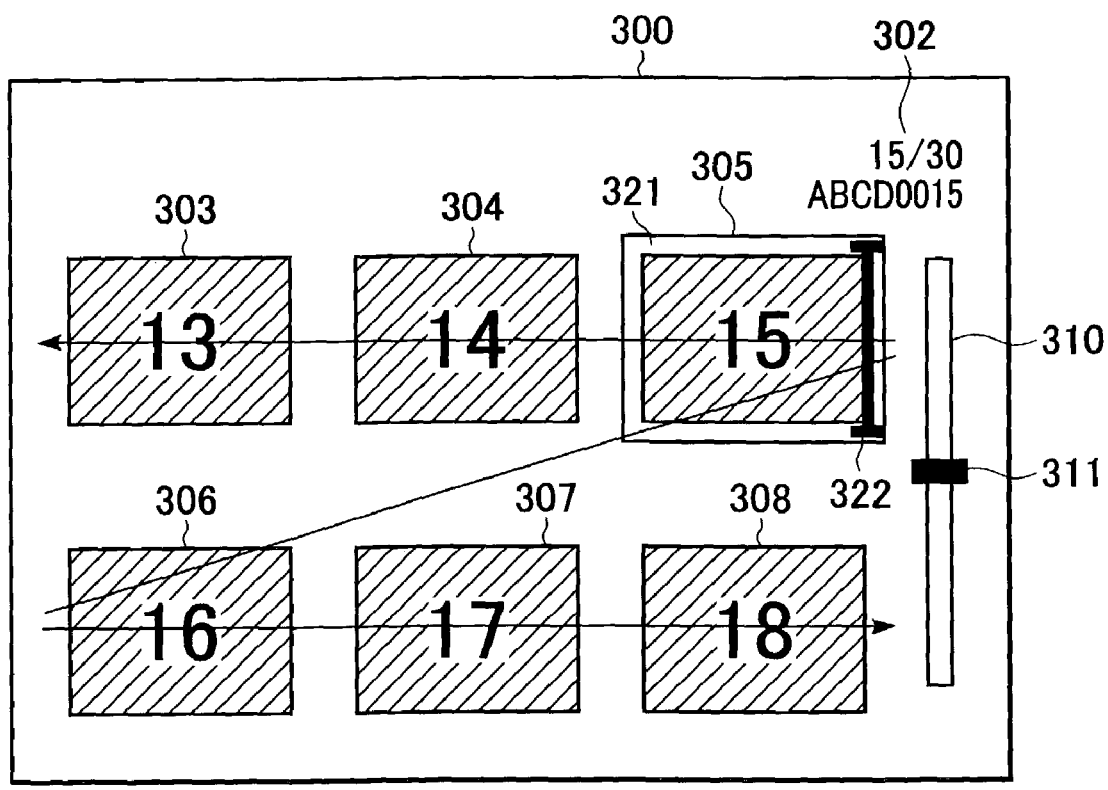
FIG. 3 is a diagram showing a reproduction selection screen for a video clip.

The mixer 111 superimposes various types of information on the image data from the decompressor 109 to generate a moving image clip selection screen shown in FIG. 3, and displays the generated moving image clip selection screen on the EVF 110 or the liquid crystal panel 113.

FIG. 3 shows a reproduction selection screen 300 (graphical user interface GUI) of moving image clips displayed at this point.

If the video camera 100 is equipped with a video output terminal for outputting data to a television monitor, or with an IEEE1394 terminal or a USB for connection with a PC, a digital television or a video cassette recorder, then the reproduction selection screen 300 may be also displayed on the connected equipment.

Referring to FIG. 3, the reproduction selection screen 300 includes representative image display regions 303 through 308 for video clips, a slider 310, a pointer 311, a video clip information display region 302, a selection frame 321 and an indicator 322.

Figure 12:
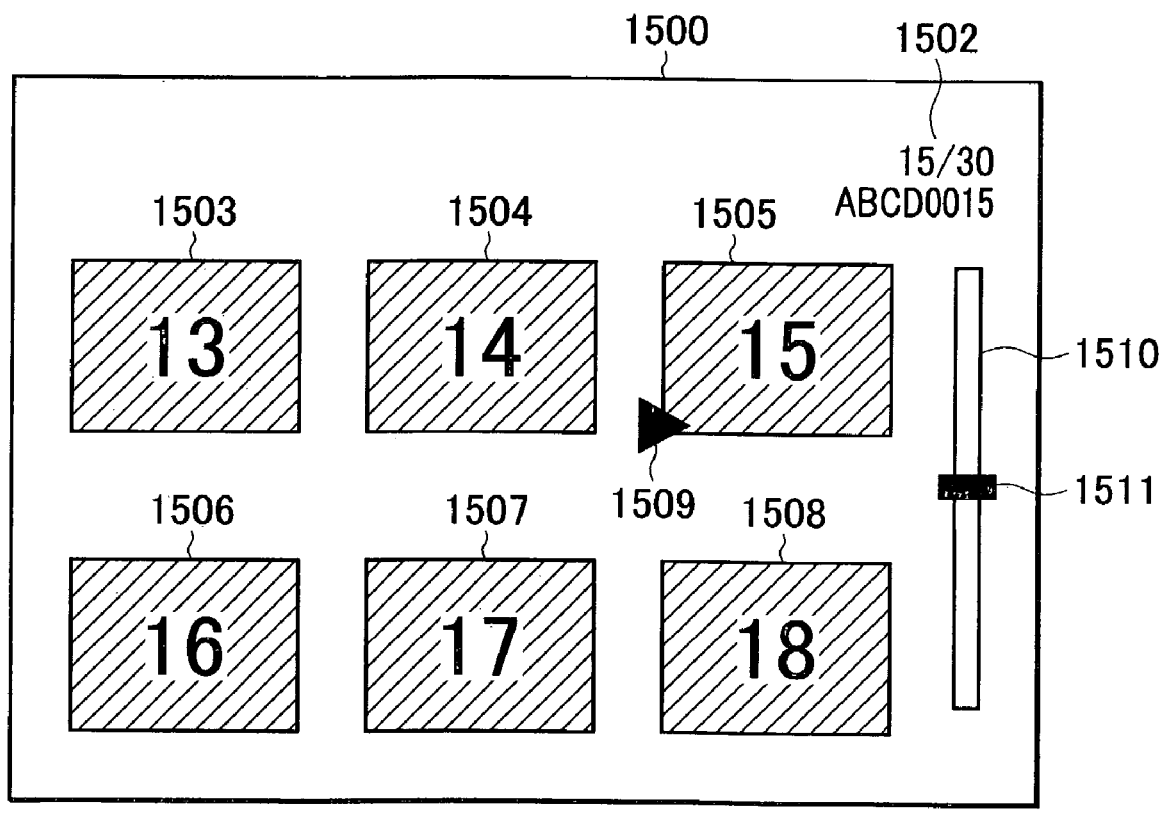
FIG. 12 is a diagram for explaining a conventional reproduction selection screen.

The representative image display regions 303 through 308, the slider 310, the pointer 311 and the video clip information display region 302 have the same functions as those of the representative image display regions 1503 through 1508, the slider 1510, the pointer 1511 and the video clip information display region 1502 shown in FIG. 12; therefore, the detailed explanation thereof will be omitted. The configuration and operation of this embodiment will be specifically explained.

The selection frame 321 is displayed to tell a user the representative image corresponding to a currently selected video clip among the representative images displayed in the representative image display regions 303 through 308.

The indicator 322 shows the reproduction start position in a selected moving image clip. In this embodiment, the head position is at the left end and the tail position is at the right end in the video clip currently selected by the selection frame 321. Operating the plus key 115b or the minus key 115c moves the indicator 322 along a horizontal axis of the selection frame 321.

Referring to FIG. 3, the video clip that corresponds to a representative image indicated in the representative image display region 305 has been selected by the selection frame 321. Furthermore, the indicator 322 shows that the reproduction will be started with the tail of the video clip corresponding to the representative image 305.

This embodiment is characterized by the selection procedure that involves the selection frame 321 and the indicator 322. The operation using the selection frame 321 and the indicator 322 is performed under the control of the microcomputer 107, as described below.

FIG. 4A illustrates a state wherein a video clip corresponding to the representative image 305 has been selected. At this time, the indicator 322 is positioned at the right end of the selection frame 321, which corresponds to the position of the tail of the selected video clip. If the user operates the minus key 115c, then the microcomputer 107 recognizes the input and controls the mixer 111 so as to move the indicator 322 to the left in the selection frame 321, as shown in FIG. 4B.

Figure 4C:
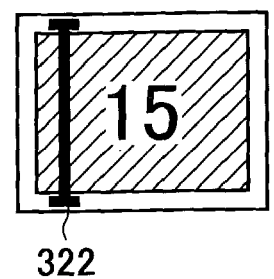
FIG. 4 is a diagram for explaining the operations of a selection frame and an indicator on the reproduction selection screen.

As the user continues operating the minus key 115c under the foregoing state, the indicator 322 moves to the left end in the selection frame 321, as shown in FIG. 4C.

The way the indicator 322 moves appears to the user as if the recording medium were a video tape being wound, despite the fact that the disk 108 is actually used as the recording medium in the embodiment.

Figure 5:
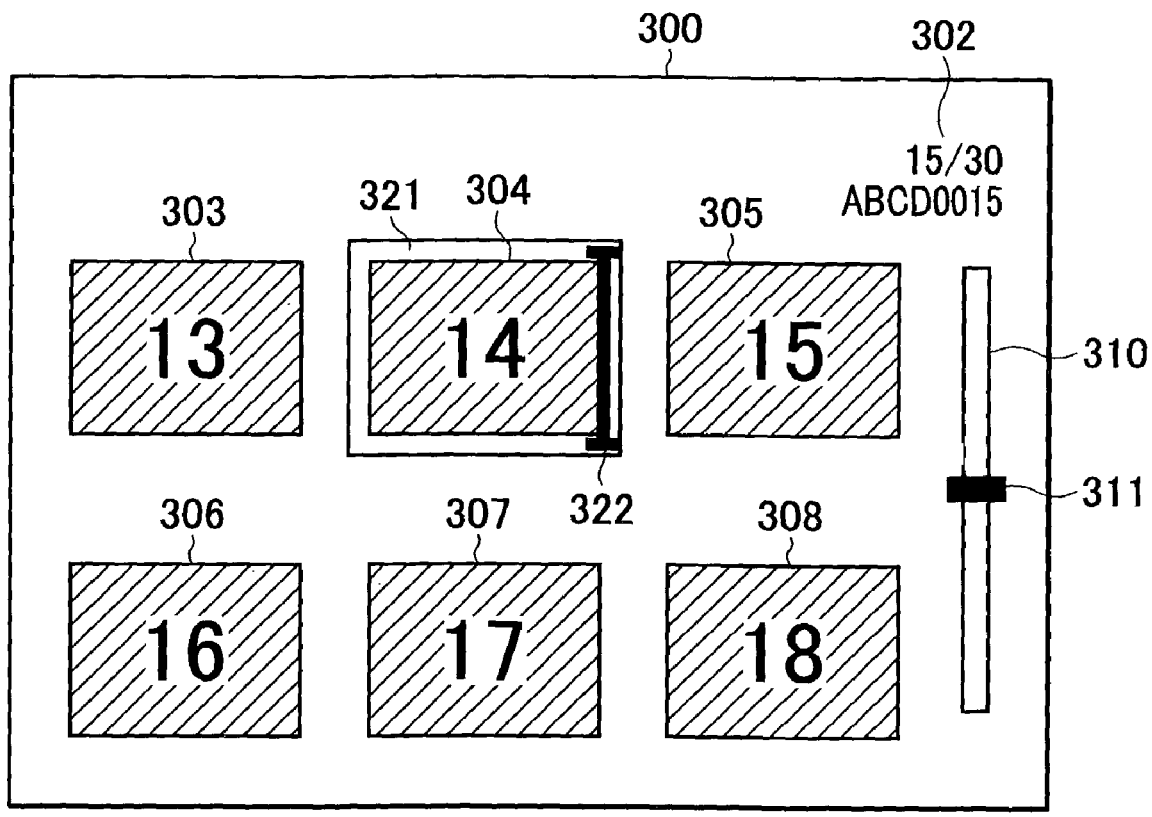
FIG. 5 is a diagram for explaining a state wherein the selection frame and the indicator have moved to the next video clip on the reproduction selection screen.

When the indicator 322 reaches the left end, as shown in FIG. 4C, that is, when the imaginary-to-the-user video tape is wound up to the head of the video clip, if the user continues operating the minus key 115c, then the selection frame 321 and the indicator 322 move from the representative image 305 to the representative image 304, as shown in FIG. 5. Thereafter, the operation explained in conjunction with FIGS. 4A through 4C can be performed in the same manner.

Thus, when the selection frame 321 moves to the representative image (the representative image 303 in this case) of the beginning video clip, and the indicator 322 moves to the left end of the display region of the representative image (wound up to the head of the video clip in the user's imagination), then the movement of the selection frame 321 and the indicator 322 stops.

When the movement of the indicator 322 is stopped and the user operates the playback key 115e, the microcomputer 107 controls the disk controller 106 to start the reproduction at the position based on the position indicated by the indicator 322 at the point when the playback key 115e is operated in the video clip corresponding to the representative image marked by the selection frame 321.

More specifically, when the playback key 115e is operated, the microcomputer 107 checks the display positions of the representative image selected by the selection frame 321 and the display position of the indicator 322 in the display region of the representative image in the display screen 300. Then, the microcomputer 107 detects the moving image file associated with the selected representative image, and detects the time required for reproducing the entire moving image file, then decides on the position where the reproduction should be started in the selected moving image file on the basis of the detected reproduction time and the display position of the indicator 322. Upon the decision of the reproduction start position, the reproduction of the moving image file is begun at the decided reproduction start position, and the disk controller 106, the decompressor 109 and the mixer 111 are controlled so as to cause the reproduced moving image to be displayed on the EVF 110 and the liquid crystal panel 112 in place of the display screen 300.

It is assumed, for example, that the time for reproducing the whole video clip that corresponds to the representative image 305 is 10 minutes and the user operates the playback key 115e in the state illustrated in FIG. 4B. The indicator 322 shown in FIG. 4B is positioned nearly at the center of the display region of the representative image 305. In this case, therefore, the reproduction is started at the point of 5 minutes from the head of the corresponding video clip.

The moving speed of the indicator 322 on the display screen 300 at this time can be determined by dividing a predetermined value by the length of the video clip marked by the selection frame 321 (normal reproduction time), the speed being equivalent to "N-fold" speed generally expressed in conjunction with a video cassette recorder or the like.

The predetermined value in this case decides the moving speed of the indicator 322. A plurality of stages, for example, may be provided for the predetermined value so as to enable the user to arbitrarily select one of them according to a menu or the like or may be made variable according to conditions.

If the user presses the plus key 115b in the display screen 300, the microcomputer 107 carries out control to move the indicator 322 in the direction of fast forward feed until the tail end of the video clip is reached or until the user issues an instruction for starting the reproduction.

In this embodiment, the plus key 115b or the minus key 115c must be operated to move the indicator 322 onto another clip from the video clip currently selected by the selection frame 321. However, an arrangement may be made, for example, so as to move either the selection frame 321 or the indicator 322 by operating the plus key 115b or the minus key 115c whenever the set key 115a is operated in a state wherein the display screen 300 is shown.

Specifically, for example, in the state wherein the mode has been changed to the reproduction mode, the indicator 322 moves when the plus key 115b or the minus key 115c is operated, and the selection frame 321 is accordingly moves as the indicator 322 moves. In this state, if the set key 115a is pressed once, then the selection frame 321 will move among the representative images 303 through 308 as the plus key 115b or the minus key 115c is pressed, and the indicator 322 will move as the selection frame 321 moves.

Thus, according to the present embodiment, when a video clip to be reproduced is selected, the representative images of the individual video clips are all displayed on the same screen and the indicator is shown on the display region of a representative image in a superimposed manner. The indicator in the display region of the representative image is moved by operating a key so as to specify a reproduction start position. This arrangement enables the user to begin the reproduction at any position in the video clip corresponding to a certain representative image.

Accordingly, this embodiment makes it possible to directly start reproduction in the middle of a video clip, while this has been impossible with the prior art, as described in conjunction with FIG. 12. In addition, the displays and the operations of the embodiment are seemingly similar to those of a video cassette recorder or the like with a tape recording medium, such as a video tape, which has been extensively used, thus maximizing the user-friendliness.

Second Embodiment

A video camera equipped with a still image shooting feature is available today. For instance, a consumer-oriented digital VCR records still images by repeatedly recording the same image in a tape for about 5 to about 6 seconds.

A video camera using a memory card or disk as its recording medium generally uses the joint photographic coding experts group (JPEG) method or the like to compress the images acquired by shooting still images, and records the compressed images in the form of a still image file in a recording medium.

In the first embodiment, the construction in which a moving image clip is selected on the display screen 300 shown in FIG. 3 has been described. Alternatively, however, a clip to be reproduced may be selected from among still images or a mixture of still images and moving images.

In the first embodiment, the moving speed of the indicator 322 has been decided on the basis of a reproduction time. This poses no problem if the indicator 322 moves within a representative image display region of a moving image. However, if the indicator 322 moves in a representative image display region of a still image, it may skip the representative image display region and move onto the next representative image display region or may stop there.

In this embodiment, therefore, the descriptions will be given of a case where image data to be reproduced is selected from among moving images and still images by using the reproduction selection screen 300.

<Configuration of the Video Camera 100 in this Embodiment>

Figure 6:
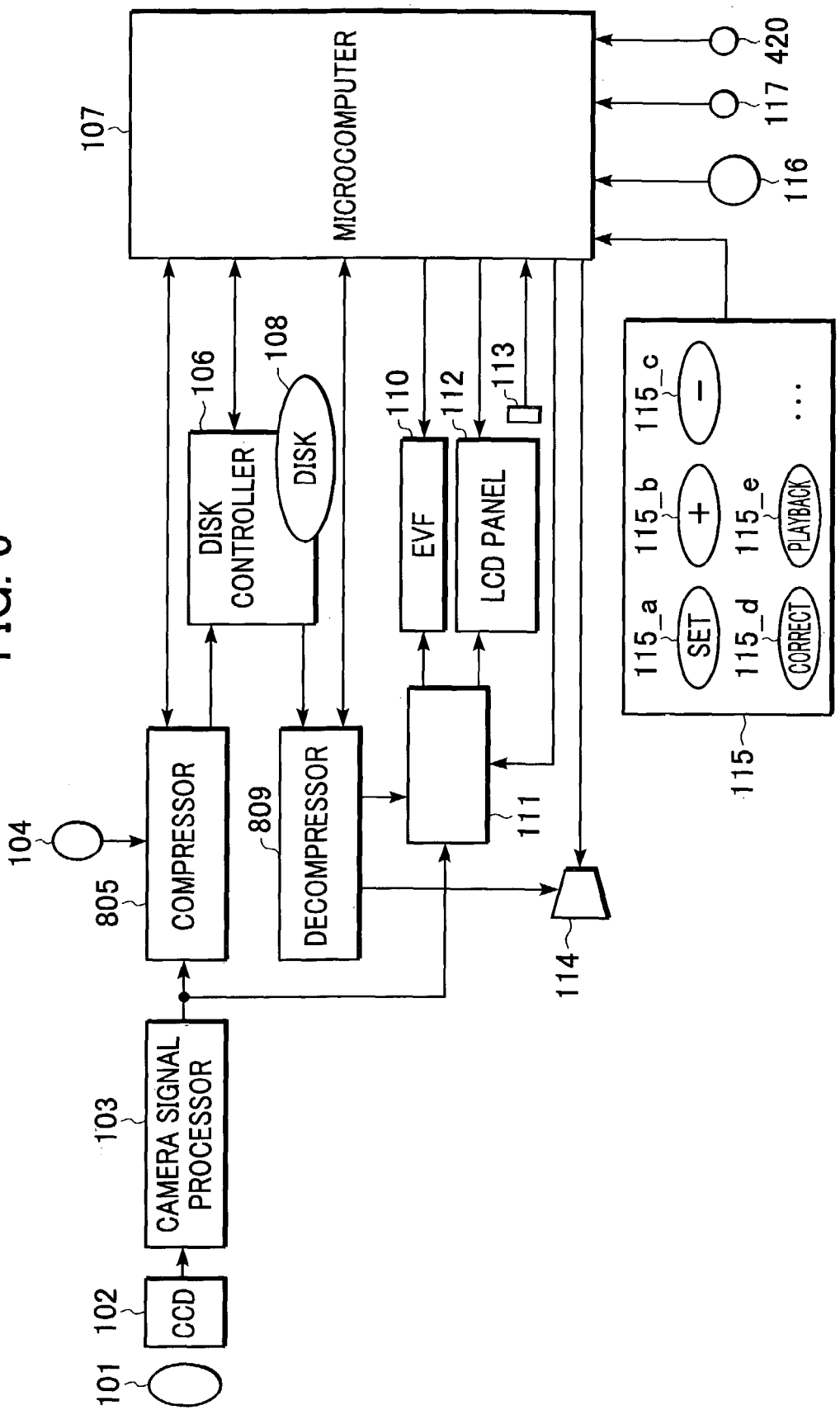
FIG. 6 is a block diagram showing the construction of a video camera according to a second embodiment, to which the present invention has been applied.

Referring to FIG. 6, a video camera 100 in this embodiment is provided with a still image recording trigger 420 in addition to the components shown in FIG. 1.

First, the operation for shooting a still image will be described.

When the camera mode is set through a mode dial 116, a microcomputer 107 causes a moving image from a camera signal processor 103 to be displayed on an EVF 110 and a liquid crystal panel 112. When the still image recording trigger 420 is operated in this state, still image shooting is carried out.

The still image recording trigger 420 has three setting positions, a first setting position corresponding to an unpressed state; a second setting position corresponding to a slightly pressed state and a third setting position corresponding to a fully pressed state. The microcomputer 107 detects at which position the still image recording trigger 420 is set.

Specifically, if the microcomputer 107 detects that the still image recording trigger 420 has been set to the second position, it then determines exposure and focus or the like by auto focusing. If the microcomputer 107 detects that the still image recording trigger 420 has been set to the third position, then it controls a compressor 805 to extract the image data of one frame that has been input to the compressor 805 at that point from among the output data from the camera processor 103, encodes the extracted image data according to the JPEG method to create still image data. At this time, thumbnail image data for the still image data is also created.

The still image data and the thumbnail image data generated by the compressor 805 are output to a disk controller 106. The disk controller 106 adds predetermined additional information to the still image data and the thumbnail image data so as to create a still image file and write it to a disk 108.

A decompressor 809 has a feature of decompressing the still image data reproduced from the disk 108 to restore original still image data and outputting the restored still image data in addition to the features similar to those in the first embodiment.

<Operation of the Video Camera 100 in this Embodiment>

The operation of the embodiment in the reproduction mode will be explained.

When the reproduction mode is selected through a mode dial 116, the microcomputer 107 controls the disk controller 106 to reproduce the thumbnail images of a moving image file and a still image file recorded in the disk 108, and outputs the reproduced thumbnail images to the decompressor 809. The decompressor 809 decodes the reproduced thumbnail images of each file, adjusts the sizes and/or display positions thereof, and outputs the decoded thumbnail images to a mixer 111.

Figure 7:
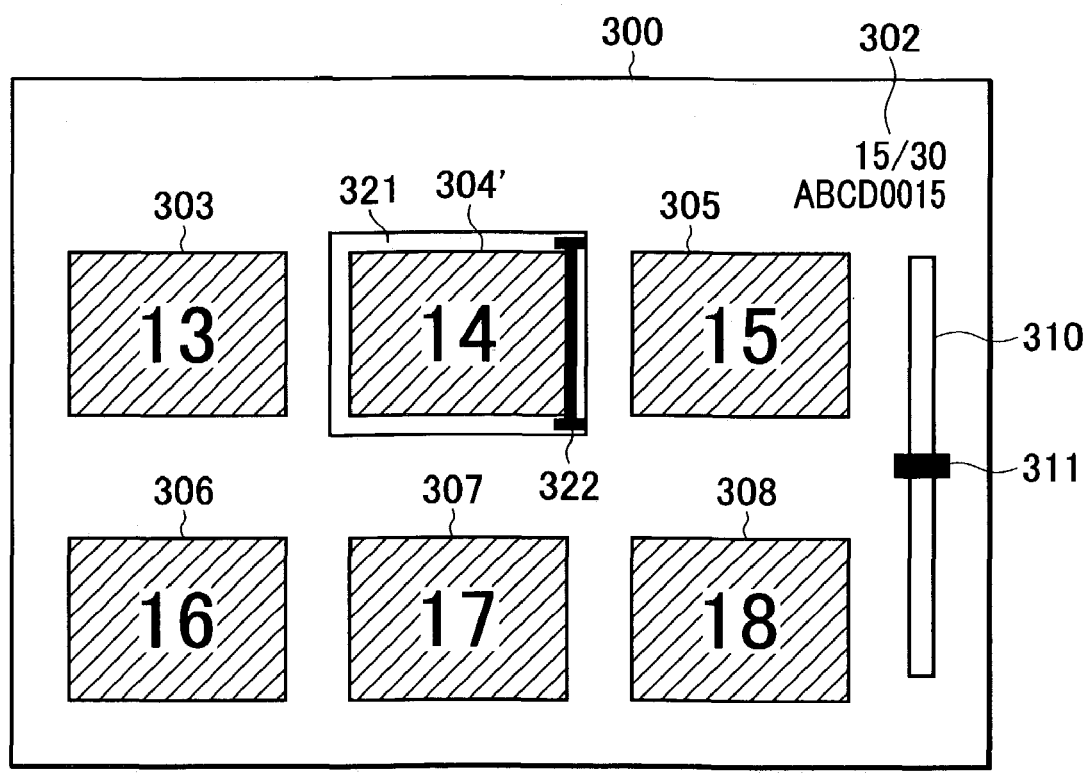
FIG. 7 is a diagram showing a reproduction selection screen for video clips or still images.

The mixer 111 superimposes various types of information on the image data from the decompressor 809 so as to create the screen for selecting a moving image clip shown in FIG. 7, then displays the created screen on an EVF 110 and a liquid crystal panel 113.

FIG. 7 shows a reproduction selection screen 300 of moving image clips displayed at this point.

The reproduction selection screen 300 shown in FIG. 7 is basically the same as the reproduction selection screen 300 in the first embodiment shown in FIG. 3 except that the thumbnail image of the still image file is displayed as a representative image 304' in FIG. 7.

Specifically, the reproduction selection screen 300 in this embodiment displays the representative images of the moving image data and the representative images of the still image data in a mixed manner as representative images 303 through 308. A user can arbitrarily select image data to be reproduced from among the moving image data and the still image data.

Furthermore, the reproduction selection screen 300 in this embodiment also displays a selection frame 321 and an indicator 322. When the user operates a minus key 115*c*, the indicator 322 moves to the left, as in the case of the first embodiment.

In this embodiment, when the selection frame 321 moves to the display region of the next representative image, the microcomputer 107 determines whether the target representative image is based on the moving image data or the still image data.

If the determination result indicates that the representative image is based on the still image data, then the microcomputer 107 moves the indicator 322 on the basis of the indicator moving speed data for a still image mode, which has been stored beforehand, to set the moving speed of the indicator 322 at a predetermined speed.

The indicator moving speed data in the still image mode may include an initial value and other values that can be arbitrarily set by the user through a menu or the like. If the user presses a playback key 115*e* in a state wherein the selection frame 321 is positioned in the display region of the representative image 304' of the still image, then the microcomputer 107 controls the disk controller 106, a decompressor 809 and the mixer 111 to reproduce the still image file corresponding to the representative image from the disk 108, and displays the reproduced still image in place of the selection screen 300.

When the user presses a plus key 115*b* rather than a minus key 115*c*, the microcomputer 107 moves the indicator 322 in the opposite direction, as in the first embodiment.

Figure 8:
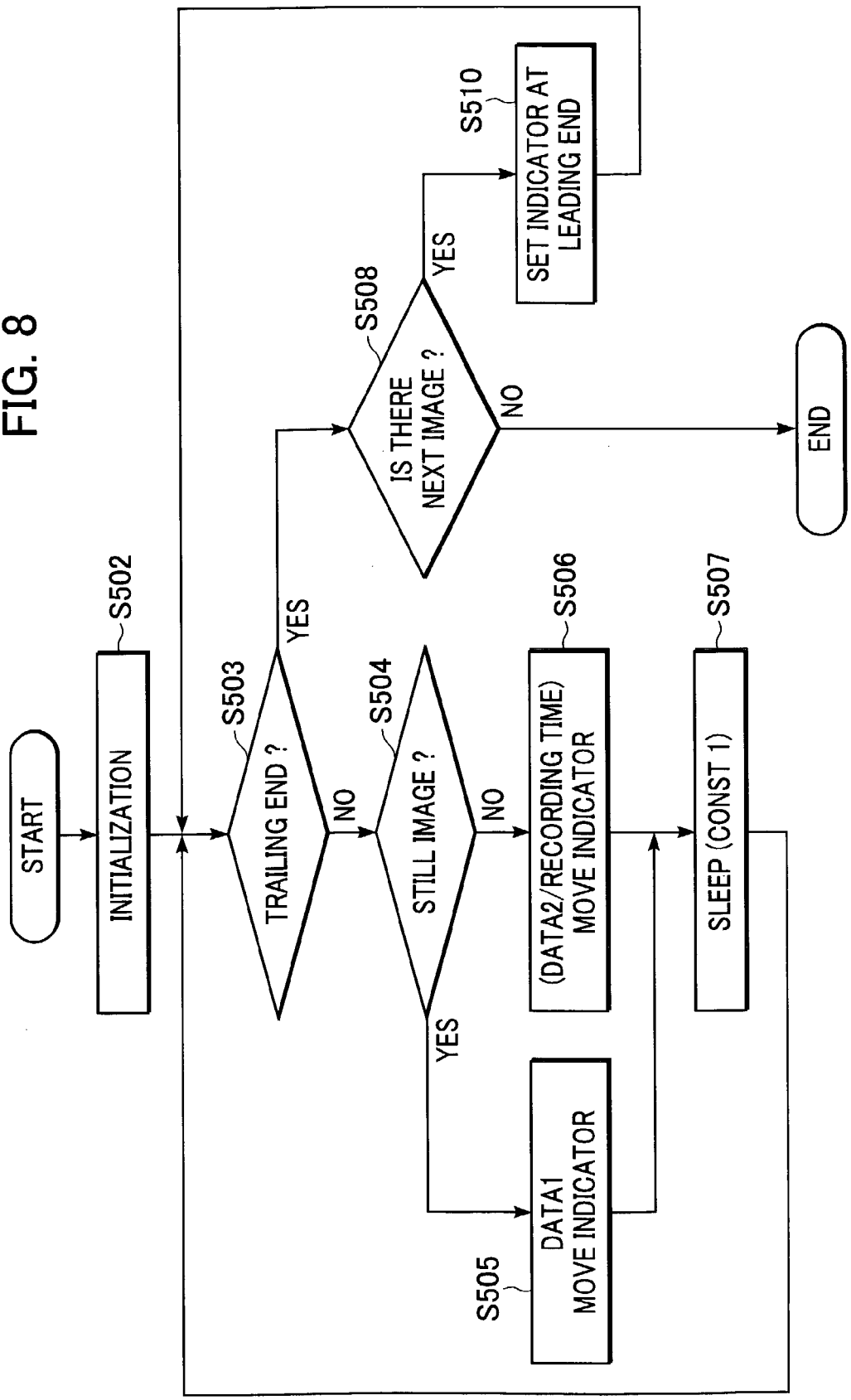
FIG. 8 is a flowchart for explaining the operation of the video camera.

FIG. 8 is a flowchart illustrating the operational control carried out by the microcomputer 107 described above.

If the user presses the minus key 115*c* or the plus key 115*b* when the reproduction selection screen 300 is displayed, then a series of operations described below will be initiated.

In the following description, for the sake of convenience, operating the minus key 115*c* will mean rewinding, while operating the plus key 115*b* will mean fast forward feed.

First, the microcomputer 107 detects whether the representative image currently selected by the selection frame 321 belongs to moving image data or still image data. If the representative image is found to belong to the moving image data, then the indicator 322 is displayed at the position based on the operation of the plus key 115*b* or the minus key 115*c*. If the representative image is found to belong to the still image data, then the indicator 322 is displayed at the beginning end of the display region of the representative image (step S502).

The head end refers to the right end of the display region of the representative image in the rewinding mode, or the left end in the fast forward feed mode, and the tail end, which will be discussed hereinafter, will refer to the opposite from the above.

Then, the microcomputer 107 determines whether the indicator 322 is positioned at the tail end on the basis of the moving direction of the indicator 322 and the current position of the indicator 322 (step S503).

If the determination results indicates that the indicator 322 is not positioned at the tail end, then it is determined whether the representative image currently selected by the selection frame 321 belongs to the moving image data or the still image data (step S504).

If the determination result indicates that the selected representative image belongs to the still image data, then the microcomputer 107 moves the display position of the indicator 322 in the forward feed direction by a predetermined value Data1 (step S505). The predetermined value Data1 is the data stored beforehand in a ROM or the like of the microcomputer 107.

If the determination result indicates that the selected representative image belongs to the moving image data, then the microcomputer 107 moves the display position of the indicator 322 in the forward feed direction by the value obtained by dividing a predetermined Data2 by the time for reproducing the currently selected moving image data (step S506). The predetermined value Data2 is the data stored beforehand in a ROM or the like of the microcomputer 107.

Then, the microcomputer 107 stops for const1, which means a predetermined time.

To be more specific, if the microcomputer 107 uses, for example, a real-time OS or the like to carry out the processing, then the foregoing const1 means the time required for shifting the task for implementing the processing to a standby mode, rather than halting the microcomputer 107.

Thereafter, the microcomputer 107 returns to step S503 to repeat the processing from steps S503 through S507 until it determines in step S503 that the tail end of the indicator 322 is reached.

If the determination result in step S503 indicates the tail end of the indicator 322, then microcomputer 107 determines whether there is a representative image display region ahead, that is, whether the next image exists, before the microcomputer 107 moves the selection frame 321 to the display region of the next representative image (step S508).

If the determination result indicates that the last image in the forward feed direction has already been reached and no representative image follows, then the microcomputer 107 carries out necessary processing, such as indicating or setting an internal flag, then terminates the routine.

If the next image exists, then the microcomputer 107 displays the indicator 322 at the beginning end of the display region of the next representative image. The beginning end in the case of a still image refers to the right end of the representative image display region in the rewinding mode, or the left end in the fast forward feed mode.

Thereafter, the microcomputer 107 returns to step S503 again.

The series of steps shown in FIG. 8 is terminated at the moment the playback key 115e is pressed.

Thus, according to the present embodiment, even when moving image data and still image data are mixed and recorded together in a single recording medium, desired image data can be easily selected and reproduced by using the selection screen on which the representative images of the moving image data and the still image data are displayed on the same screen.

Moreover, as in the first embodiment, reproduction can be easily started at a desired position in moving image data.

Third Embodiment

The first and second embodiments have been characterized by the operations of the selection frame 321 and the indicator 322 on the reproduction selection screen 300 when reproducing image data from the disk 108. This embodiment is characterized by the addition of a feature for changing the representative images.

Figure 9:
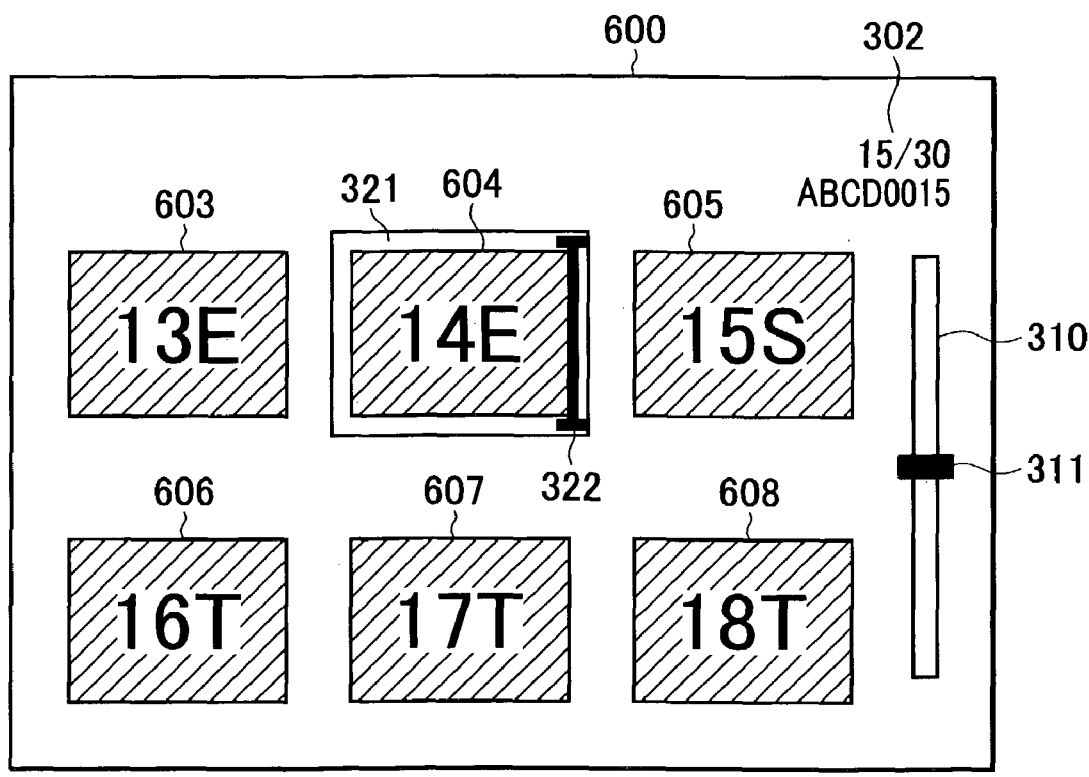
FIG. 9 is a diagram showing a reproduction selection screen in a third embodiment.

FIG. 9 shows a reproduction selection screen 600 displayed in the reproduction mode in the third embodiment.

In the reproduction selection screen 600 shown in FIG. 9, the components having the like functions as those in the reproduction selection screen 300 shown in FIG. 3, etc. will be assigned like reference numerals and the detailed explanations thereof will be omitted.

Representative images 603, 604 and 606 through 608 are the representative images of moving image clips. In this embodiment, a screen at a predetermined position in each moving image clip is reproduced and the size of the screen is reduced to display it as a representative image rather than displaying a thumbnail image added to a moving image file at the time of recording as a representative image, as in the aforesaid embodiments.

The representative images 603 and 604 shown in FIG. 9 are the last frames of a corresponding moving image clip that have been reduced in size for display. The representative images 606 through 608 are the leading frame of a corresponding moving image clip that have been reduced for display.

The representative image 605 belongs to a still image clip, and uses a thumbnail image added to a still image file at the time of recording, as in the aforesaid embodiments. Referring to FIG. 9, the representative image 604 has been selected, as marked by a selection frame 321. In this state, if a user operates the system to issue a playback instruction, then the reproduction is begun with the last portion of the moving image clip corresponding to the representative image 604.

The configuration of this embodiment is characterized by the feature for changing the representative image of a moving image clip as the indicator 322 is moved. This feature will be explained in conjunction with FIGS. 10A through 10C.

Figure 10A:
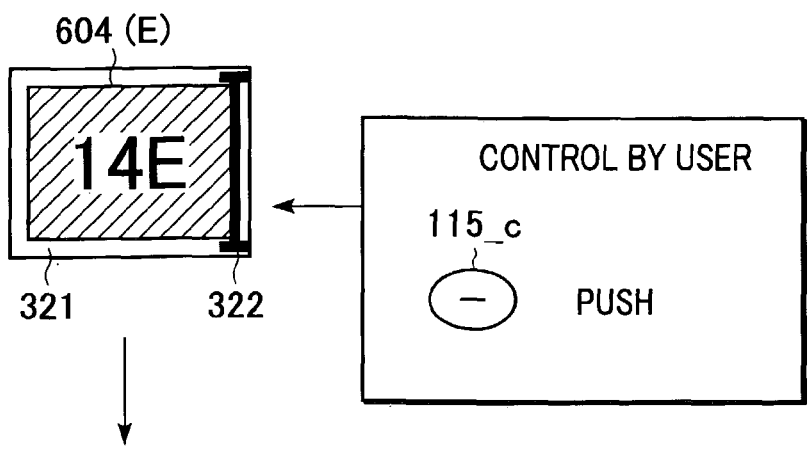
FIG. 10 is a diagram for explaining the operations of a selection frame and an indicator on the reproduction selection screen.

First, FIG. 10A shows a state wherein the representative image 604 is currently selected. In FIG. 10A, the indicator 322 is positioned at the right end in the selection frame 321, meaning that the last portion of the corresponding moving image clip is specified by the indicator 322.

Figure 10B:
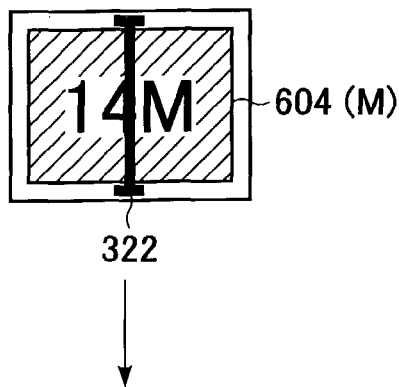

In this state, if the user presses a minus key 115c, the microcomputer 107 recognizes this and carries out control so as to move the indicator 322 to the left in the selection frame 321, as shown in FIG. 10B.

At this time, the microcomputer 107 detects the position of the indicator 322 and controls a disk controller 106 so as to reproduce the screen corresponding to the position of the indicator 322 in the display region of the representative image 604 as a new representative image.

For instance, when the indicator 322 moves to the vicinity of the center of the display region of the representative image 604, as shown in FIG. 10B, the microcomputer 107 reproduces the image data of the frame reproduced in the middle of the reproduction time in the moving image clip corresponding to the representative image 604. The microcomputer 107 further controls a disk controller 106, a decompressor 809 and a mixer 111 so as to use the above reproduced image data for displaying a new representative image to replace a currently reproduced last frame 14E. As a result, in the moving image clip corresponding to the representative image 604, a frame 14M located substantially in the middle is displayed as the new representative image, as shown in FIG. 10B. Thus, the representative images to be displayed are changed as if a tape-like recording medium is rewound.

Figure 10C:
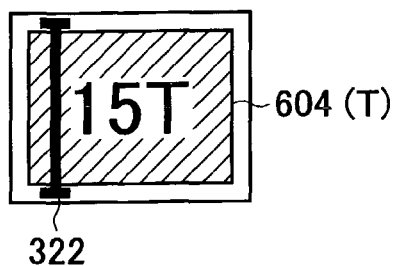

If the minus key 115c is held depressed in the above state, the indicator 322 moves to the left end in the selection frame 321, as shown in FIG. 10C, under the control of the microcomputer 107.

In this case also, as the indicator 322 approaches the left end of the display region of the representative image 604, the microcomputer 107 controls the disk controller 106, the decompressor 809 and the mixer 111 so as to reproduce the frame at the head portion of the moving image clip corresponding to the representative image 604 and to use the reproduced frame as a new representative image. Thus, as shown in FIG. 10C, the representative image 604 shifts from the frame 14M in the vicinity of the center of the moving image clip to a leading frame 14T as the indicator 322 moves.

As described above, according to the present embodiment, for the moving image clip that precedes the representative image wherein the selection frame 321 exists (in the rewinding direction), the last frame of the moving image clip that has been reduced in size is displayed as a representative image. For the moving image clip that follows the representative image wherein the selection frame 321 exists (in the fast forward feeding direction), the leading frame of the moving image clip that has been reduced in size is displayed as a representative image.

Furthermore, for the moving image clip wherein the selection frame 321 is present, the image of the frame associated with the position of the indicator 322 in a corresponding moving image clip is reduced in size and displayed as the representative image.

The same procedure as that in the second embodiment applies to still images; therefore, detailed explanations will be omitted.

Thus, according to this embodiment, the representative image of a moving image clip changes as the indicator is moved in the reproduction selection screen 600. This arrangement enables a user to easily find a desired start point for reproduction.

In this embodiment, as the indicator is moved, appropriate switching has been carried out among the three frames, namely, the last frame, the middle frame and the leading frame, of a moving image clip; however, the present invention is not limited thereto. Alternatively, more frames may be used to switch among them to provide representative images according to the position of the indicator.

The object of the present invention can be also fulfilled by providing a system or an apparatus with a storage medium that stores a program code of the software for implementing the functions of a host and a terminal according to the first to third embodiments, so that a computer, a CPU or an MPU of the system or the apparatus reads and executes the program code stored in the storage medium.

In this case, the program code itself read from the storage medium will implement the functions of the first to third embodiments, and the storage medium in which the program code has been stored and the program code will constitute the present invention.

The storage medium for supplying the program code may be a ROM, a flexible disk, a hard disk, an optical disk, a magneto-optical disk, a CD-ROM, a CD-R, a magnetic tape, or a nonvolatile memory card.

The present invention includes not only the case where the features of the first to third embodiments are implemented by executing the program code read by a computer, but also includes a case where an OS or the like running on a computer carries out a part of or entire actual processing according to the instructions of the program code so as to implement the features of the first to third embodiments.

Furthermore, the present invention also includes a case where the program code read from a storage medium is written to a memory provided in a feature expansion board inserted in a computer or a feature expansion unit connected to a computer, then a CPU or the like provided in the feature expansion board or the feature expansion unit carries out a part of or all actual processing according to the instructions of the program code so as to implement the features of the first to third embodiments.

Figure 11:
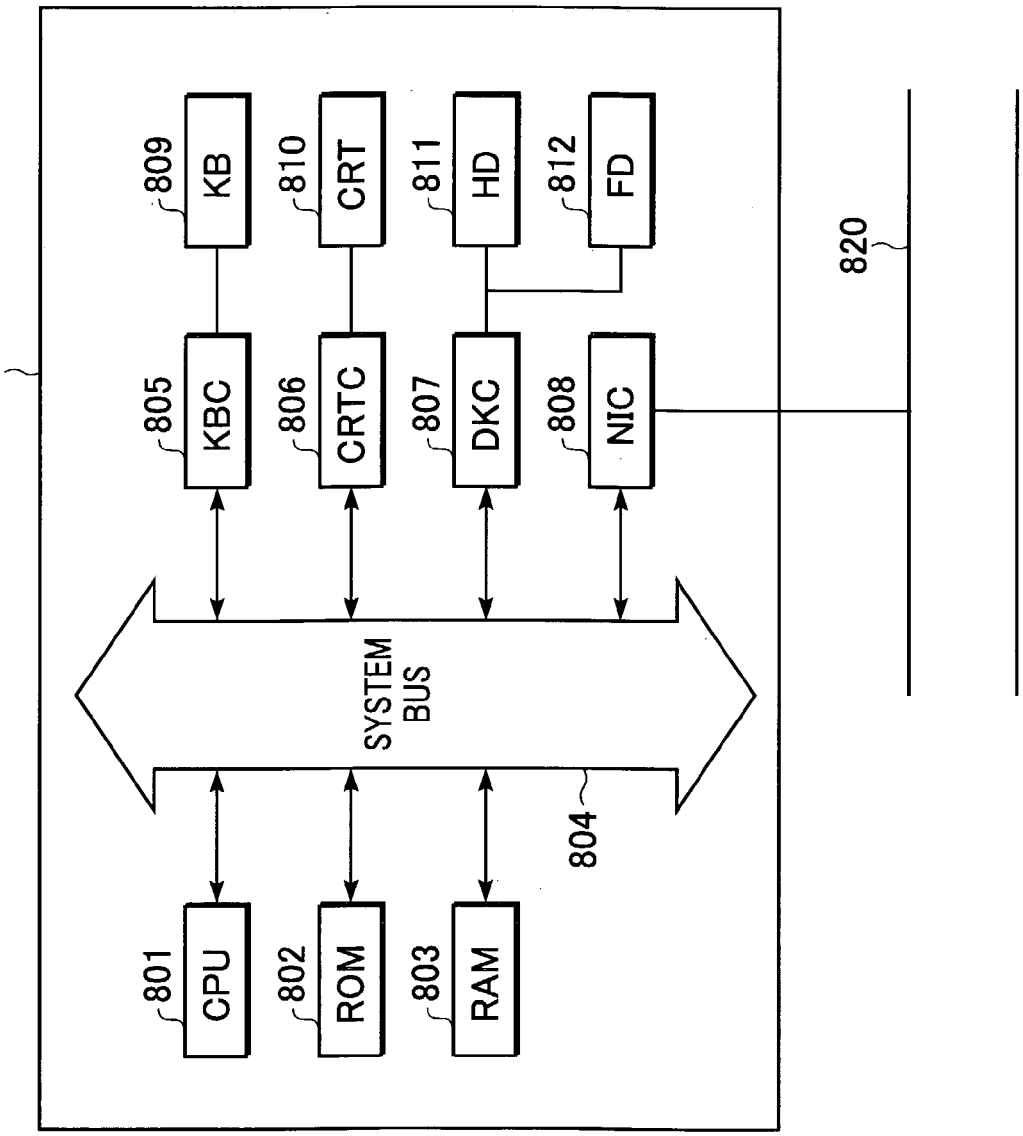
FIG. 11 is a block diagram showing a configuration of a computer for reading a program for causing the computer to implement a function of a video camera from a computer-readable storage medium and executing the program.

FIG. 11 shows a feature 800 of the computer.

Referring to FIG. 11, the computer feature 800 has a CPU 801, a ROM 802, a RAM 803, a keyboard controller (KBC) 805 of a keyboard (KB) 809, a CRT controller (CRTC) 806 of a CRT display (CRT) 810 serving as a display unit, a disk controller (DKC) 807 of a hard disk (HD) 811 and a flexible disk (FD) 812, and a network interface controller (NIC) 808 for connection with a network 820. All the components are connected via a system bus 804 so as to permit mutual communication.

The CPU 801 runs the software stored in the ROM 802 or the HD 811, or the software supplied from the FD 812 thereby to carry out general control over the components connected to the system bus 804.

In other words, the CPU 801 reads a processing program based on a predetermined processing sequence from the ROM 802, the HD 811 or the FD 812, and executes the processing program to conduct the control for carrying out the operations in the first to third embodiments.

The RAM 803 functions as a main memory or a work area or the like of the CPU 801. The KBC 805 controls the input of instructions from the KB 809 or a pointing device or the like, which is not shown. The CRTC 806 controls the display of the CRT 810. The DKC 807 controls the access to the HD 811 and the FD 812 that mainly store boot programs, diverse application programs, editing files, user files, network management programs, predetermined processing programs in the first to third embodiments. The NIC 808 exchanges data with apparatuses or systems on the network 820 in a two-way manner.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A reproducing apparatus comprising:
   a reproducing unit adapted to reproduce a plurality of segments of moving image data showing a series of moving images from a recording medium;
   a displaying unit adapted to display on a display screen a plurality of representative images respectively corresponding to the plurality of segments of moving image data, each of the representative images corresponding to a different one of the segments of moving image data and each having a corresponding display region on the display screen;
   a selector adapted to select one of the plurality of representative images, wherein the displaying unit displays an indicator together with the plurality of representative images on the same screen, the indicator indicating a reproduction start position in a segment of moving image data corresponding to a selected representative image;
   an instruction unit adapted to instruct movement of the indicator so as to arbitrarily designate the reproduction start position of the segment of moving image data corresponding to the selected representative image; and
   a reproduction controller adapted to determine a reproduction start position in the segment of moving image data corresponding to the selected representative image on the basis of the display position of the selected representative image, the display position of the indicator within the display region corresponding to the selected representative image, and the total reproduction time of the segment of moving image data corresponding to the selected representative image, and to control said reproducing unit to reproduce the segment of moving image data corresponding to the selected representative image from the reproduction start position.

2. An apparatus according to claim 1, wherein said displaying unit displays the indicator by superimposing it on the selected representative image.

3. An apparatus according to claim 2, wherein said displaying unit moves the indicator within the display range of the selected representative image.

4. An apparatus according to claim 2, wherein said displaying unit moves the display position of the indicator into the display range of a representative image displayed adjacently to a currently selected representative image if said instruction unit instructs moving the indicator beyond the display range of the selected representative image.

5. An apparatus according to claim 4, wherein said displaying unit displays selection information indicating the representative image selected by said selector, adding the selection information to the representative image of the selected moving image data, and moves the selection information from the representative image of the selected moving image data to an adjacent displayed representative image if said instruction unit issues an instruction for moving the indicator beyond the display region of the selected representative image.

6. An apparatus according to claim 1, wherein said displaying unit further replaces the representative image by another image according to an instruction issued by said instruction unit.

7. An apparatus according to claim 1, wherein said displaying unit forms the representative image using one frame of a plurality of frames of the moving image data.

8. An apparatus according to claim 1, wherein said displaying unit includes a representative image generating unit adapted to generate the representative image by reducing a picture size of the moving image data.

9. An apparatus according to claim 1, wherein each segment of moving image data is stored in a separate MPEG file.

10. A reproduction apparatus comprising:
- a reproducing unit adapted to reproduce a plurality of segments of moving image data showing a series of moving images from a recording medium;
- a displaying unit adapted to display on a display screen a plurality of representative images respectively corresponding to the plurality of segments of moving image data, each of the representative images corresponding to a different one of the segments of moving image data;
- a selector adapted to select one of the plurality of representative images,
- wherein the displaying unit displays an indicator together with the plurality of representative images on the same screen, the indicator indicating a reproduction start position in a segment of moving image data corresponding to a selected representative image;
- an instruction unit adapted to instruct movement of the indicator so as to arbitrarily designate the reproduction start position of the segment of moving image data corresponding to the selected representative image; and
- a reproduction controller adapted to determine a reproduction start position in the segment of moving image data corresponding to the selected representative image on the basis of a display position of the selected representative image,
- wherein the displaying unit changes a display position of the indicator in response to the selector selecting a different representative image, the indicator being displayed at a position corresponding to the display position of the selected representative image,
- wherein each of the representative images displayed on the display screen by the displaying unit has a corresponding display region on the display screen,
- wherein the reproduction controller determines the reproduction start position on the further basis of the display position of the indicator within the display region corresponding to the selected representative image and the total reproduction time of the segment of moving image data corresponding to the selected representative image, and
- wherein the reproduction controller controls the reproducing unit to reproduce the segment of moving image data corresponding to the selected representative image from the reproduction start position.

11. An apparatus according to claim 10, wherein the displaying unit displays selection information indicating the representative image selected by said selector, adding the selection information to the representative image of the selected moving image data, and moves the selection information from the representative image of the selected moving image data to an adjacent displayed representative image if the instruction unit issues an instruction for moving the indicator beyond the display region of the selected representative image.

12. An apparatus according to claim 10, wherein the displaying unit further replaces the representative image by another image according to an instruction issued by the instruction unit.

\* \* \* \* \*